United States Patent
Tan et al.

(10) Patent No.: US 10,549,260 B2
(45) Date of Patent: Feb. 4, 2020

(54) CARBON DIOXIDE ABSORBENT COMPOSITION AND METHOD FOR CAPTURING CARBON DIOXIDE

(71) Applicants: NATIONAL TSING HUA UNIVERSITY, Hsinchu (TW); Chang Chun Plastics Co., Ltd., Taipei (TW); Chang Chun Petrochemical Co., LTD., Taipei (TW)

(72) Inventors: Chung-Sung Tan, Hsinchu (TW); Hao Chen, Hsinchu (TW); Wei-Han Hsiao, Hsinchu (TW)

(73) Assignees: NATIONAL TSING HUA UNIVERSITY, Hsinchu (TW); Chang Chun Plastics Co., Ltd., Taipei (TW); Chang Chun Petrochemical Co., LTD., Taipei (TW)

( * ) Notice: Subject to any disclaimer, the term of this patent is extended or adjusted under 35 U.S.C. 154(b) by 177 days.

(21) Appl. No.: 15/679,173

(22) Filed: Aug. 17, 2017

(65) Prior Publication Data

US 2018/0236437 A1      Aug. 23, 2018

(30) Foreign Application Priority Data

Feb. 18, 2017  (TW) .............................. 106105480 A

(51) Int. Cl.
  *B01J 20/22*   (2006.01)
  *B01D 53/06*   (2006.01)

(52) U.S. Cl.
  CPC ............ *B01J 20/223* (2013.01); *B01D 53/06* (2013.01); *B01J 20/22* (2013.01); *B01D 2253/20* (2013.01); *B01D 2257/504* (2013.01)

(58) Field of Classification Search
  CPC ................ B01D 53/1493; B01D 53/14; B01D 53/1475; B01D 2252/50; B01D 2252/504; B01D 2252/2056; B01D 2252/20447; B01D 2252/204; B01D 2252/20494; B01D 2252/2041
  USPC ........... 252/184; 95/236; 423/228, 229, 220, 423/226, 437.1
  See application file for complete search history.

(56) References Cited

U.S. PATENT DOCUMENTS 4,444,973 A * 4/1984 Schonfelder ........... C08G 18/61
                                                   428/412

FOREIGN PATENT DOCUMENTS

| CN | 101785954 A | 7/2010 |
| CN | 102284227 A | 12/2011 |

\* cited by examiner

*Primary Examiner* — Thuan D Dang
(74) *Attorney, Agent, or Firm* — CKC & Partners Co., LLC

(57) ABSTRACT

A carbon dioxide absorbent composition is disclosed. Based on 100 parts by weight of the carbon dioxide absorbent composition, the carbon dioxide absorbent composition includes 5 to 45 parts by weight of sodium 2-[(2-aminoethyl)amino]ethanesulfonate. Moreover, a method for capturing carbon dioxide using the carbon dioxide absorbent composition is disclosed.

4 Claims, 8 Drawing Sheets
(1 of 8 Drawing Sheet(s) Filed in Color)

CARBON DIOXIDE ABSORBENT COMPOSITION AND METHOD FOR CAPTURING CARBON DIOXIDE

RELATED APPLICATIONS

This application claims priority to Taiwan Application Serial Number 106105480, filed Feb. 18, 2017, which is herein incorporated by reference.

BACKGROUND

Technical Field

The present disclosure relates to a carbon dioxide ($CO_2$) absorbent composition and a method for capturing $CO_2$. More particularly, the present disclosure relates to a $CO_2$ absorbent composition including an amino acid salt and a method for capturing $CO_2$ using the same.

Description of Related Art

In recent years, the greenhouse effect affects the whole world significantly. The extreme weather is getting worse globally, which is caused by the increasing atmospheric $CO_2$ concentration due to the overuse of fossil fuels. The atmospheric $CO_2$ concentration before the Industrial Revolution is about 280 ppm. However, in June 2016, the average of atmospheric $CO_2$ concentration detected by the monitoring station of Mauna Loa in Hawaii is up to 404.08 ppm. The increase degree of the atmospheric $CO_2$ concentration is significant. For reducing the global warming, how to reduce the atmospheric $CO_2$ concentration becomes one of the most important issues.

The main source of the atmospheric $CO_2$ is the burning of fossil fuels. All countries are committed to develop the renewable energy for replacing the thermal power plant, such as coal-fired power plant. However, according to the estimation of BP Statistical Review of World Energy, among the fossil fuels, the amount of the coal still can be used more than 100 years. Due to the low cost, it is inevitable to generate electricity by burning fossil fuels. If the emission of $CO_2$ generated from the burning of fossil fuels can be effectively reduced, the atmospheric $CO_2$ concentration can be reduced significantly.

Nowadays, the main $CO_2$ capture technology applied to thermal power plant is chemical absorption method. When using the chemical absorption method, the high-temperature flue gas generated by burning the fossil fuels, such as coal and natural gas, is first cooled down and the impurities are removed. Then the $CO_2$ of the flue gas is absorbed with an amine absorbent or an alcohol amine absorbent. Afterwards, the absorbent is introduced into a reboiler to regenerate the high purity $CO_2$, and the $CO_2$ can be further fixed or reused. However, the chemical absorption method has the drawbacks of high regeneration energy and bulky equipment. Take the monoethanolamine (MEA) for example, MEA is the most widely used $CO_2$ absorbent, and the regeneration energy thereof is 3.2-5.5 GJ/tonne of $CO_2$.

To sum up, how to improve the $CO_2$ capture technology for preventing the drawbacks of high regeneration energy and bulky equipment and providing other advantages, such as low dissolved oxygen value (DO) and prolonging the lifetime of the absorbent, is the goal of the relevant industry and academia.

SUMMARY

According to one aspect of the present disclosure, a $CO_2$ absorbent composition is disclosed. Based on 100 parts by weight of the $CO_2$ absorbent composition, the $CO_2$ absorbent composition includes 5 to 45 parts by weight of sodium 2-[(2-aminoethyl)amino]ethanesulfonate.

According to another aspect of the present disclosure, a method for capturing $CO_2$ is disclosed. The method for capturing $CO_2$ includes steps as follows. A rotating packed bed (RPB) is provided. A gas and a liquid are introduced into the RPB, in which the gas includes $CO_2$ and the liquid is a $CO_2$ absorbent composition. Based on 100 parts by weight of the $CO_2$ absorbent composition, the $CO_2$ absorbent composition includes 5 to 45 parts by weight of sodium 2-[(2-aminoethyl)amino]ethanesulfonate. The gas and the $CO_2$ absorbent composition are contacted. Thus, the $CO_2$ of the gas is captured by the $CO_2$ absorbent composition.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DETAILED DESCRIPTION

$CO_2$ Absorbent Composition

Figure 1:
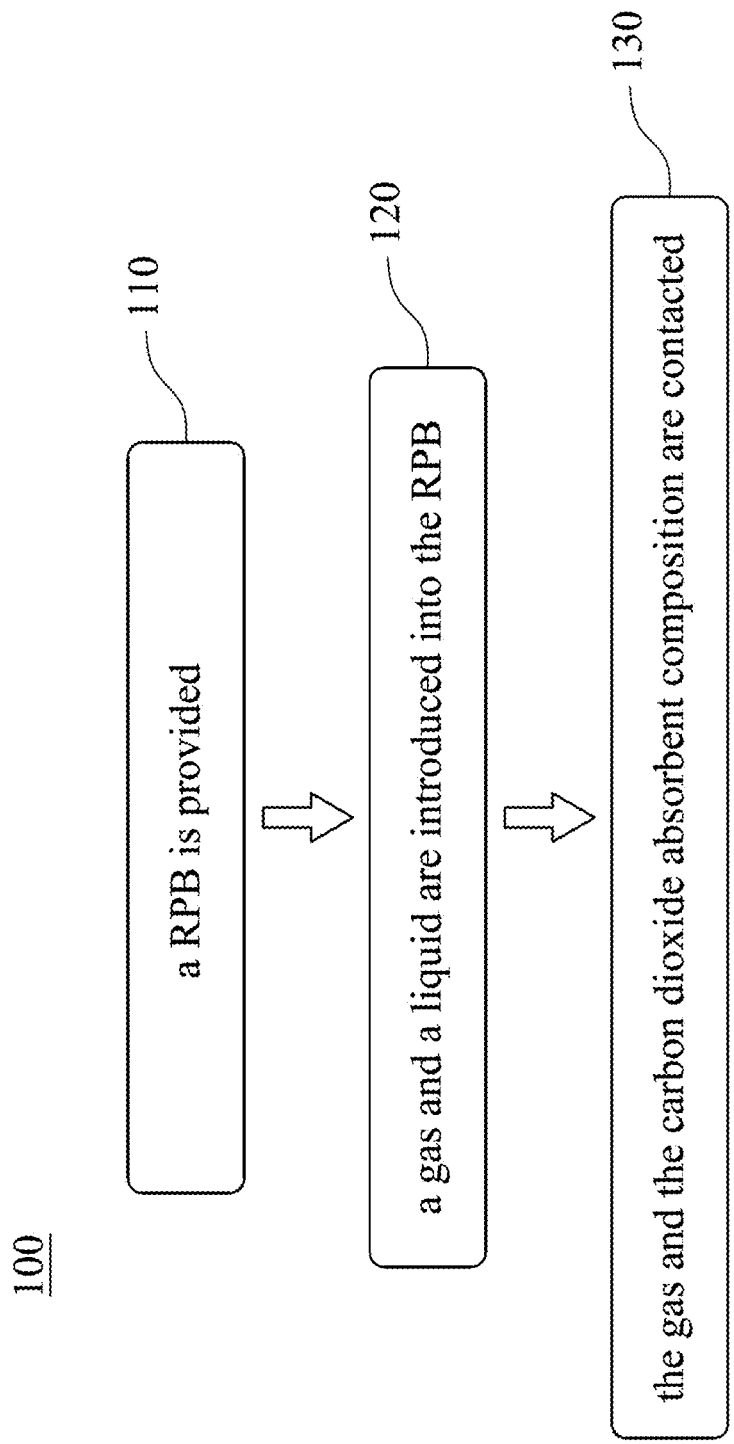
FIG. 1 is a flow diagram showing a method for capturing $CO_2$ according to one embodiment of the present disclosure.

A $CO_2$ absorbent composition is provided by the present disclosure. Based on 100 parts by weight of the $CO_2$ absorbent composition, the $CO_2$ absorbent composition includes 5 to 45 parts by weight of sodium 2-[(2-aminoethyl)amino]ethanesulfonate (hereinafter, NaADS). Thus, a regeneration energy and a DO value of the $CO_2$ absorbent composition can be reduced. On one hand, the environmental protection demands can be satisfied. One the other hand, the deterioration of the $CO_2$ absorbent composition can be suppressed, which can prolong the lifetime of the $CO_2$ absorbent composition. The aforementioned "deterioration" mainly refers the oxidative degradation caused by oxygen ($O_2$). The oxidative degradation not only causes the deterioration of the $CO_2$ absorbent composition, but also results in equipment corrosion, which increases the operation cost and impacts the environment. Conventionally, an $O_2$ inhibitor, such as sodium sulfite, is added into a $CO_2$ absorbent composition for decreasing the DO value thereof. The $O_2$ is consumed by reacting with the sodium sulfite. However, the reaction between the $O_2$ and the sodium sulfite is a chemical reaction. It requires to regularly supplement the sodium sulfite and regularly remove the by-product of the reaction. Accordingly, the cost is increased, and it is unfavorable for conducting the process of capturing $CO_2$ continuously. With the $CO_2$ absorbent composition including the NaADS, the DO value of the $CO_2$ absorbent composition can be reduced without adding the $O_2$ inhibitor. Furthermore, NaADS has a lower corrosivity. Comparing to the conventional absorbent including MEA or DETA, the $CO_2$ absorbent composition according to the present disclosure is less corrosive to the equipment, so that the lifetime of the equipment can be prolonged.

According to the $CO_2$ absorbent composition of the present disclosure, the $CO_2$ absorbent composition can further include 2.5 to 25 parts by weight of piperazine (hereinafter, PZ). That is, the $CO_2$ absorbent composition can include the NaADS and the PZ. Thus, the capture efficiency for $CO_2$ of the $CO_2$ absorbent composition can be enhanced. A total weight of the NaADS and the PZ can be 30 to 60 parts by weight. Therefore, an excellent capture efficiency for $CO_2$ can be provided, and the NaADS and the PZ separated from the $CO_2$ absorbent composition can be prevented.

According to the $CO_2$ absorbent composition of the present disclosure, the $CO_2$ absorbent composition can further include diethylenetriamine (hereinafter, DETA). That is, the $CO_2$ absorbent composition can include the NaADS, the PZ and the DETA, wherein a weight of the DETA is greater than 0 parts by weight and is less than or equal to 15 parts by weight. Therefore, the capture efficiency for $CO_2$ can be further enhanced. Meanwhile, an excessive amount of the DETA which tends to corrode the equipment can be prevent. A total weight of the NaADS, the PZ and the DETA can be 30 to 60 parts by weight. Therefore, an excellent capture efficiency for $CO_2$ can be provided, and the NaADS, the PZ and the DETA separated from the $CO_2$ absorbent composition can be prevented.

Method for Capturing $CO_2$

A method for capturing $CO_2$ is provided by the present disclosure. FIG. 1 is a flow diagram showing a method for capturing $CO_2$ 100 according to one embodiment of the present disclosure. In FIG. 1, the method for capturing $CO_2$ 100 includes Step 110, Step 120 and Step 130.

Figure 2:
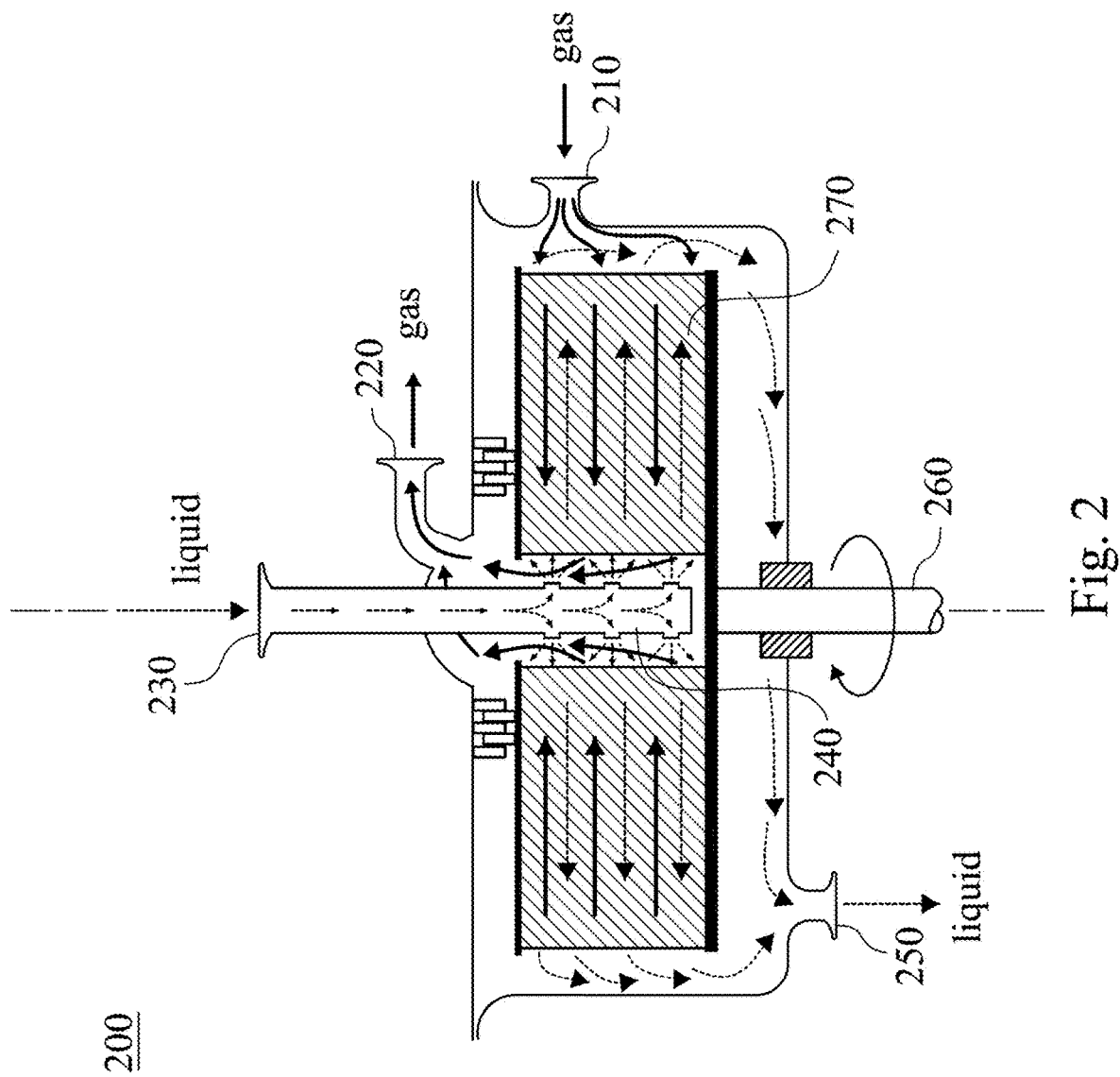
FIG. 2 is a schematic view of a RPB according to another embodiment of the present disclosure.

In Step 110, a RPB is provided. FIG. 2 is a schematic view of a RPB 200 according to another embodiment of the present disclosure. The RPB 200 includes a gas inlet 210, a gas outlet 220, a liquid inlet 230, a liquid distributor 240, a liquid outlet 250, a rotation shaft 260 and a packed layer 270. The packed material of the packed layer 270 can be, but is not limited to, a metal material, such as steel wool. When the RPB 200 is in operation, the rotation shaft 260 drives the packed layer 270 to rotate, a liquid is introduced into the RPB 200 through the liquid inlet 230, followed by being distributed into the packed layer 270 via the liquid distributor 240. Meanwhile, a gas is introduced into the RPB 200 through the gas inlet 210, then the gas flows into the packed layer 270. The gas and the liquid are contacted in the packed layer 270. Then the liquid flows out through the liquid outlet 250, and the gas flows out through the gas outlet 220. According to the method for capturing $CO_2$ 100 of the present disclosure, a rotational speed of the RPB 200 (i.e., a rotational speed of the rotation shaft 260) can be 1000 rpm (revolution per minute) to 3200 rpm. Therefore, the dispersity of the liquid and the residence time of the liquid in the RPB 200 can be balanced. Moreover, the volume of the equipment used in the method for capturing $CO_2$ 100 can be effectively reduced by adopting the RPB 200. According to the method for capturing $CO_2$ 100 of the present disclosure, the gas introduced into the RPB 200 includes $CO_2$. For example, the gas can be a gas product (i.e., flue gas) generated by burning the fossil fuels, such as a coal or natural gas, in a thermal power plant. More specifically, the gas introduced into the RPB 200 can exemplary be a flue gas of a coal-fired power plant. The liquid introduced into the RPB 200 is the $CO_2$ absorbent composition according to the present disclosure. With the gas and the liquid being contacted in the packed layer 270, the $CO_2$ of the gas can be captured by the $CO_2$ absorbent composition. Accordingly, the emission of $CO_2$ generated from the burning of fossil fuels can be effectively reduced.

Refer back to FIG. 1. In Step 120, a gas and a liquid are introduced into the RPB, in which the gas includes $CO_2$ and the liquid is a $CO_2$ absorbent composition. In Step 130, the gas and the $CO_2$ absorbent composition are contacted. Thus, the $CO_2$ of the gas is captured by the $CO_2$ absorbent composition. Details of the $CO_2$ absorbent composition are mentioned above and are not repeated herein. Details of Step 120 and Step 130 can refer to the description related to FIG. 2, and are not repeated herein.

Examples and Comparative Examples

The $CO_2$ absorbent composition of Ex. 1-9 and Com Ex. 1-2 are provided, wherein Ex. represents to an Example, and Com Ex. represents to a Comparative Example. The $CO_2$ absorbent composition of Ex. 1-9 and Com Ex. 1-2 are obtained by mixing the ingredients thereof. The ingredients of the $CO_2$ absorbent composition of Ex. 1-9 are listed in Table 1. The ingredients of the $CO_2$ absorbent composition of Com Ex. 1-2 are listed in Table 2.

TABLE 1

| ingredient | NaADS | PZ | DETA | water |
|---|---|---|---|---|
| | (unit: wt %) | | | |
| Ex. 1 | 5 | 25 | 0 | the remaining amount |
| Ex. 2 | 10 | 20 | 0 | the remaining amount |
| Ex. 3 | 10 | 15 | 15 | the remaining amount |
| Ex. 4 | 25 | 15 | 0 | the remaining amount |
| Ex. 5 | 30 | 15 | 15 | the remaining amount |
| Ex. 6 | 35 | 5 | 0 | the remaining amount |
| Ex. 7 | 35 | 2.5 | 2.5 | the remaining amount |
| Ex. 8 | 45 | 2.5 | 2.5 | the remaining amount |
| Ex. 9 | 30 | 0 | 0 | the remaining amount |

TABLE 2

(unit: wt %)

| ingredient | MEA | water |
|---|---|---|
| Com Ex. 1 | 30 | the remaining amount |

| ingredient | PZ | DETA | water |
|---|---|---|---|
| Com Ex. 2 | 15 | 15 | the remaining amount |

Measurements of Properties of Examples and Comparative Examples

Figure 3:
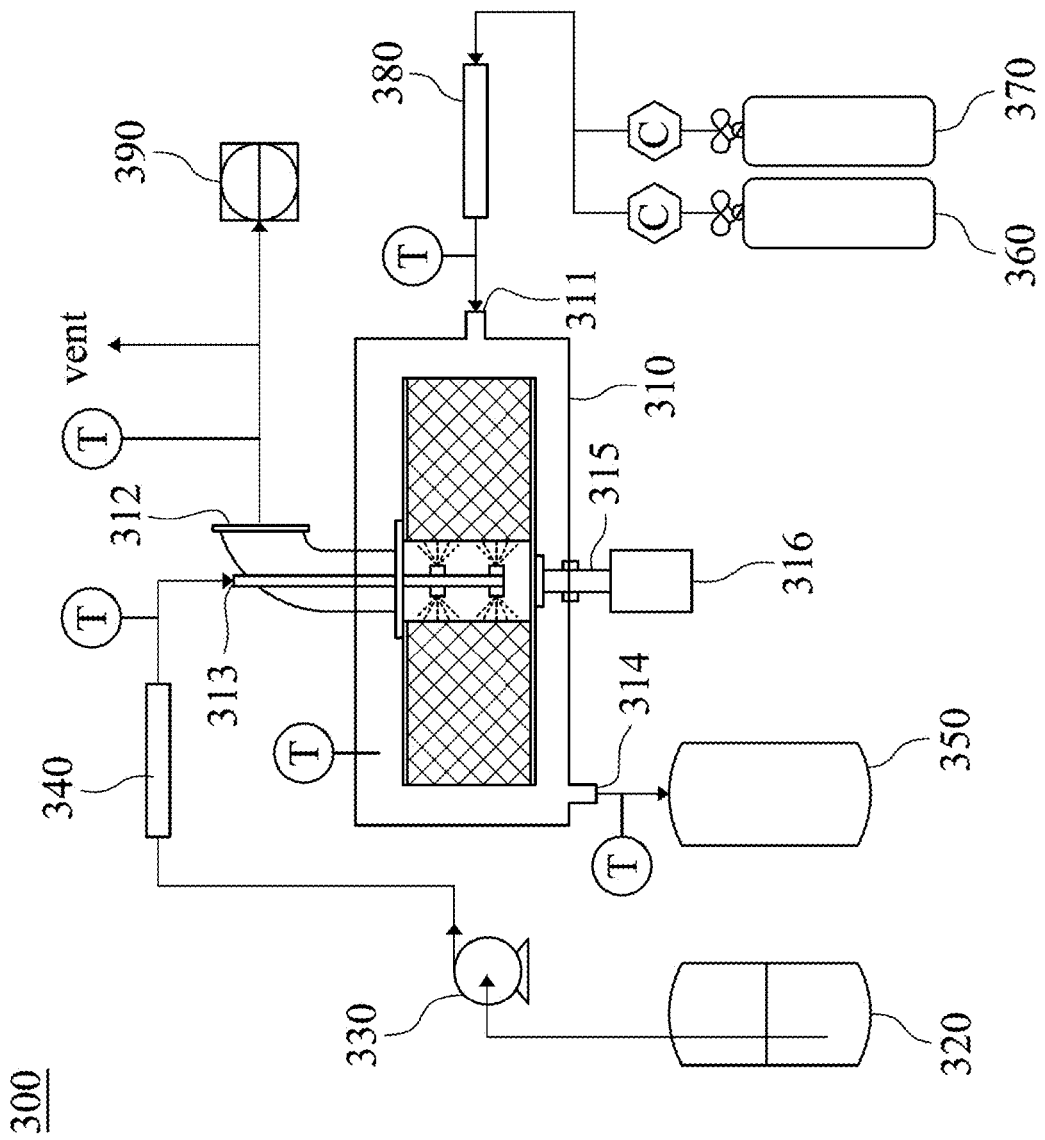
FIG. 3 is a schematic view of a capturing device adopting the RPB to capture $CO_2$.

The capture efficiency of $CO_2$: FIG. 3 is a schematic view of a capturing device 300 adopting a RPB 310 to capture $CO_2$. The capturing device 300 includes the RPB 310, an absorbent storage tank 320, a metering pump 330, a liquid heater 340, an absorbent recycling tank 350, a nitrogen ($N_2$) source 360, a $CO_2$ source 370, a gas heater 380 and a $CO_2$ analyzer 390. The RPB 310 includes a gas inlet 311, a gas outlet 312, a liquid inlet 313, a liquid outlet 314, a rotation shaft 315 and a motor 316. The motor 316 is applied to drive the rotation shaft 315 to rotate. Details of the RPB 310 can refer to the description related to FIG. 2 and are not repeated herein. In FIG. 3, T represents a thermometer, C represents a gas flow meter. The absorbent storage tank 320 is applied to store a fresh $CO_2$ absorbent composition (i.e., the $CO_2$ absorbent composition is not yet applied to capture $CO_2$ after prepared). The metering pump 330 is applied to pump the $CO_2$ absorbent composition of the absorbent storage tank 320 into the RPB 310. The liquid heater 340 is applied to heat the liquid to a desired temperature before the liquid introduced into the RPB 310 (hereinafter, the liquid introduced into the RPB 310 is also called feed liquid). The $N_2$ source 360 and the $CO_2$ source 370 are applied to provide the gas introduced into the RPB 310 (hereinafter, the gas introduced into the RPB 310 is also called feed gas; moreover, the gas introduced into the RPB 310 can be a gas mixture of $N_2$ and $CO_2$). The gas heater 380 is applied to heat the feed gas to a desired temperature. The $CO_2$ analyzer 390 is applied to analyze the $CO_2$ concentration of the gas flowing out from the gas outlet 312 (hereinafter, the gas flowing out from the gas outlet 312 is also called outlet gas).

The experiment of capturing $CO_2$ includes steps as follows. A cleaning and preheating step is firstly conducted, followed by conducting a capturing step. In the cleaning and preheating step, the metering pump 330 is connected with a water source (not shown), then the metering pump 330, the liquid heater 340 and the motor 316 are turned on. A warn water with a temperature of 50° C. is introduced into the RPB 310 when the RPB 310 rotates for cleaning and preheating the interior of the RPB 310, meanwhile, the gas heater 380 and the $N_2$ source 360 are turned on, so that the $N_2$ with a temperature of 50° C. is introduced into the RPB 310 to exclude other gases therein. When the temperature of the interior of the RPB 310 reaches to 50° C., the capturing step is conducted. In the capturing step, the object of measurement, i.e., one the $CO_2$ absorbent composition of the examples and the comparative examples, is placed in the absorbent storage tank 320, and the absorbent storage tank 320 is placed in a water bath (not shown) with a temperature of 50° C. A feed gas which is a gas mixture of $N_2$ and $CO_2$ is introduced into the RPB 310, wherein the $CO_2$ concentration of the feed gas is 10 vol %. The rotational speed of the RPB 310 is adjusted to the operating condition of the experiment. The $CO_2$ absorbent composition is pumped into the RPB 310 by the metering pump 330. When the temperatures of the feed gas and feed liquid reach to the desired temperature of the experiment, the $CO_2$ concentration of the outlet gas is analyzed and recorded by the $CO_2$ analyzer 390. The capture efficiency of $CO_2$ is calculated by the following formula: [(the $CO_2$ concentration of the feed gas−the $CO_2$ concentration of the outlet gas)/the $CO_2$ concentration of the feed gas]×100%. Furthermore, $K_Ga$ is calculated by the following formula:

$$K_Ga\left(\frac{1}{\sec}\right) = \frac{Q_G}{\pi z(r_o^2 - r_i^2)} \ln\left(\frac{Y_i}{Y_o}\right);$$

wherein $Q_G$ is the volume flow rate of the feed gas, Z is the height of the packed layer of the RPB 310, $r_o$ is an outer diameter of the packed layer of the RPB 310, $r_i$ is an inner diameter of the packed layer of the RPB 310, $Y_i$ is the $CO_2$ concentration of the feed gas, and $Y_o$ is the $CO_2$ concentration of the outlet gas.

Figure 4:
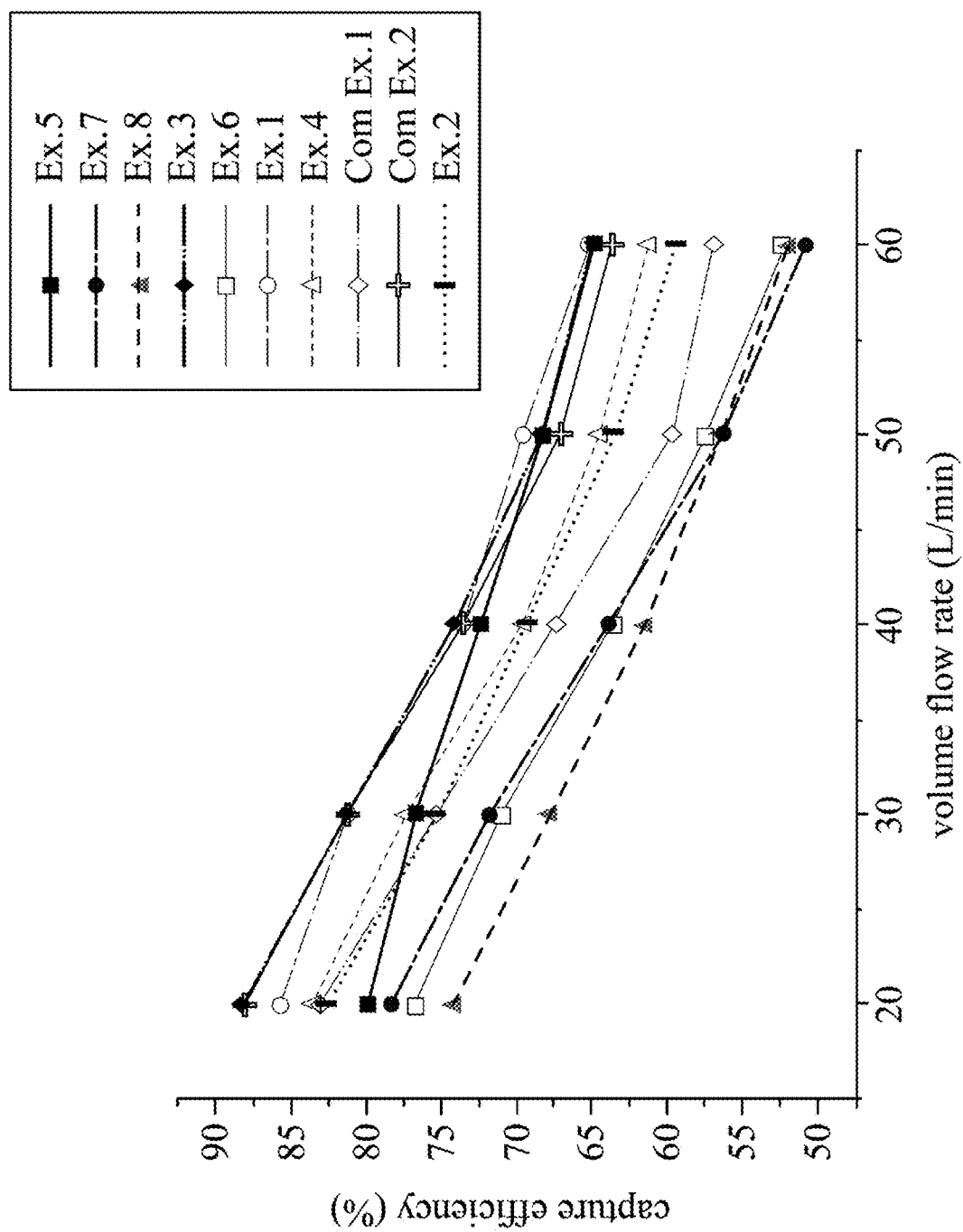
FIG. 4 shows relationships of the capture efficiency for $CO_2$ and the volume flow rate of a feed gas of Examples (Exs.) 1-8 and Comparative Examples (Com Exs.) 1-2.

FIG. 4 shows relationships of the capture efficiency of $CO_2$ and the volume flow rate of the feed gas of Exs. 1-8 and Com Exs. 1-2. The operating conditions of the experiment of FIG. 4 is as follows: the temperature is 50° C., the rotational speed of the RPB is 1600 rpm, the volume flow rate of the feed liquid is 100 mL/min, and the $CO_2$ concentration of the feed gas is 10 vol %. In FIG. 4, the capture efficiency of $CO_2$ of each of Exs. 1-8 and Com Exs. 1-2 decreases along with the increase of the volume flow rate of the feed gas. The reason is that when the volume flow rate of the feed gas is increased, the resistance of the gas phase mass transfer can be reduced; however, the contact time of the gas and the liquid is shortened, and the amount of $CO_2$ in the unit time introduced into the RPB is increased, both of which leads to the downtrend of the capture efficiency of $CO_2$. As further shown in FIG. 4, the capture efficiency of $CO_2$ provided by the $CO_2$ absorbent composition according to the present disclosure is comparable to that provided by the conventional $CO_2$ absorbent composition (such as Com Ex. 1 or Com Ex. 2).

Figure 5:
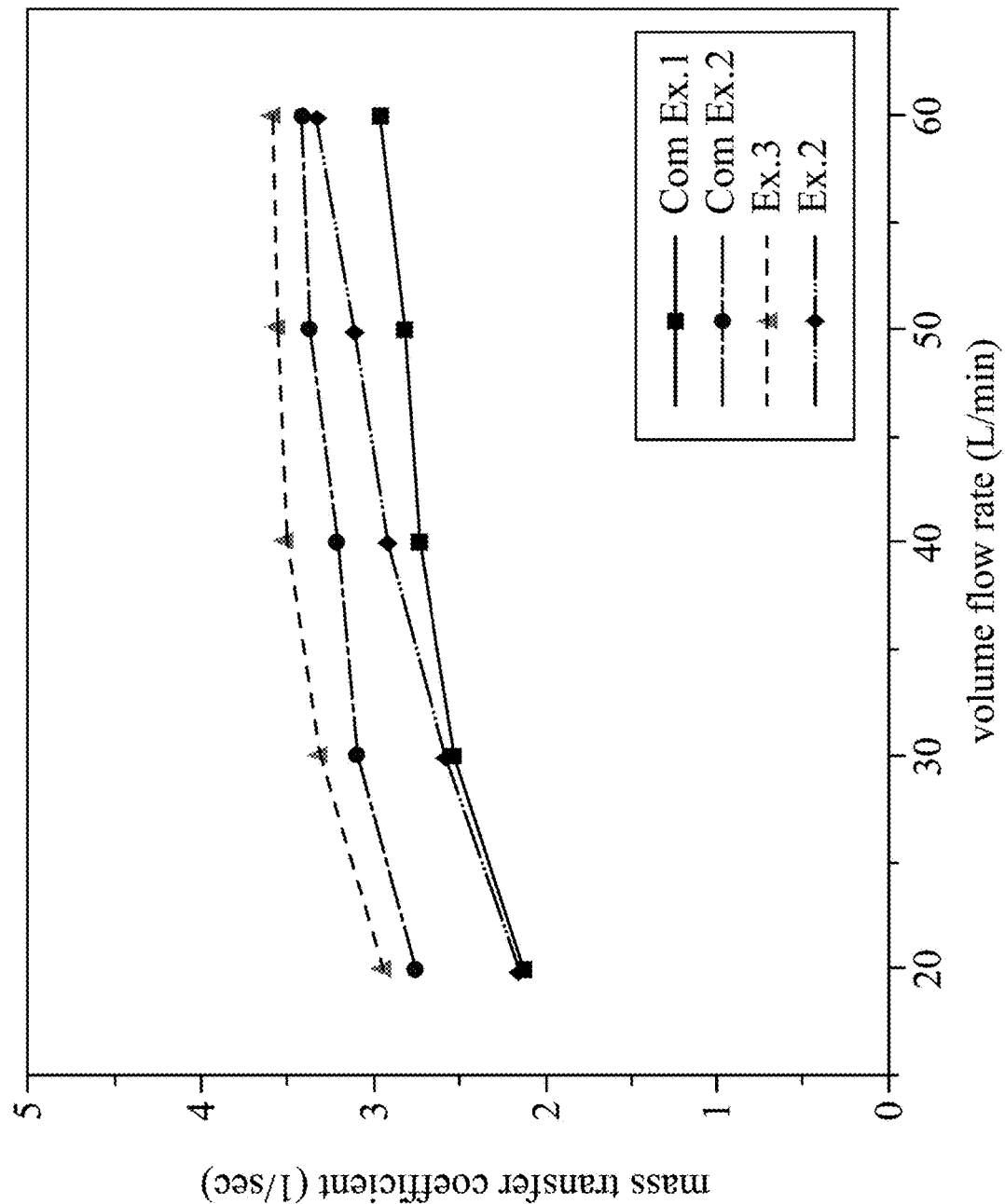
FIG. 5 shows relationships of the mass transfer coefficient and the volume flow rate of the feed gas of Exs. 2-3 and Com Exs. 1-2.

FIG. 5 shows relationships of the mass transfer coefficient ($K_Ga$) and the volume flow rate of the feed gas of Exs. 2-3 and Com Exs. 1-2. The operating conditions of the experiment of FIG. 5 is as follows: the temperature is 50° C., the rotational speed of the RPB is 1600 rpm, the volume flow rate of the feed liquid is 100 ml/min, and the $CO_2$ concentration of the feed gas is 10 vol %. In FIG. 5, the $K_Ga$ of each of Exs. 2-3 and Com Exs. 1-2 increases along with the increase of the volume flow rate of the feed gas. The reason is that when the volume flow rate of the feed gas is increased, the resistance of the gas phase mass transfer is reduced, so that the efficiency of the gas phase mass transfer can be enhanced. Furthermore, when the volume flow rate of the feed gas is in the range of 20 L/min to 60 L/min, the $K_Ga$ of each of Exs. 2-3 is greater than that of Com Ex. 1, and the $K_Ga$ of Ex. 3 is greater than that of Com Ex. 2.

Saturated DO value: the $CO_2$ absorbent composition of the example/comparative example intended to be measured is placed in a reaction container. The reaction container is heated to 50° C., and the $N_2$ is introduced into the reaction container with stirring the $CO_2$ absorbent composition for removing the $O_2$ in the $CO_2$ absorbent composition. When the DO value of the $CO_2$ absorbent composition is reduced to less than 0.2 mg/L, a gas mixture of $N_2$ and $CO_2$ is introduced into the reaction container, wherein the $CO_2$ concentration of the gas mixture is 5 vol %, and the volume flow rate of the gas mixture is controlled at the value of 550 ml/min. When the DO value of the $CO_2$ absorbent composition is saturated, the DO value of the $CO_2$ absorbent composition is measured with a dissolved oxygen meter (CellOx 325, WTW, Germany) coordinated a host (Oxi3210, WTW, Germany).

Table 3 shows the saturated DO values of Exs. 2-4, 9 and Com Exs. 1-2. The operating conditions of the experiment of Table 3 is as follows: the pressure is 1 atm, the temperature is 50° C., and the gas ratio of the gas mixture is $N_2/O_2$=95 vol %/5 vol %.

TABLE 3

| example/comparative example | saturated DO value (mg/l) |
|---|---|
| Ex. 2 | 0.62 |
| Ex. 3 | 0.51 |
| Ex. 4 | 0.41 |
| Ex. 9 | 0.26 |

TABLE 3-continued

| example/comparative example | saturated DO value (mg/l) |
|---|---|
| Com Ex. 1 | 1.36 |
| Com Ex. 2 | 1.16 |

In Table 3, the saturated DO value of each of Exs. 2-4 and 9 is far less than that of each of Com Exs. 1 and 2. Comparing Ex. 3 with Com Ex. 1, the saturated DO value is reduced about 62.5%. Comparing Ex. 3 with Com Ex. 2, the saturated DO value is reduced about 56.03%. Comparing Ex. 9 with Corn Ex. 1, the saturated DO value is reduced about 80.88%. Comparing Ex. 9 with Com Ex. 2, the saturated DO value is reduced about 77.59%.

Table 4 shows the saturated DO values of Ex. 3 and Com Exs. 1-2. The operating conditions of the experiment of Table 4 is as follows: the pressure is 1 atm, the temperature is 50° C., and the gas ratio of the gas mixture is $N_2/CO_2/O_2$=85 vol %/10 vol %/5 vol %. Moreover, each of Ex. 3 and Com Exs. 1-2 has two saturated DO values and two $CO_2$ loadings, wherein the left saturated DO value is corresponding to the left $CO_2$ loading which is equal to 0 mol of $CO_2$/mole of amine, and the right saturated DO value is corresponding to the right $CO_2$ loading which is not equal to 0 mol of $CO_2$/mole of amine. The left saturated DO value and the left $CO_2$ loading are obtained by the aforementioned experiment of measuring the saturated DO value but replacing the gas mixture of $N_2$ and $O_2$ with the gas mixture of $N_2$, $CO_2$ and $O_2$. The right saturated DO value and the right $CO_2$ loading are obtained similarly but with one extra step. That is, when the $O_2$ of the $CO_2$ absorbent composition is removed, before introducing the gas mixture of $N_2$, $CO_2$ and $O_2$, the $CO_2$ is introduced into the reaction container until the $CO_2$ loading of the $CO_2$ absorbent composition reaches to the predetermined value. The $CO_2$ loading is a ratio of the mole number of $CO_2$ of the $CO_2$ absorbent composition to the mole number of amine-containing compounds of the $CO_2$ absorbent composition. According to the present disclosure, NaASD, PZ, DETA and MEA are classified as the amine-containing compounds.

TABLE 4

| example/comparative example | $CO_2$ loading (mol of $CO_2$/mol of amine) | saturated DO value (mg/l) |
|---|---|---|
| Ex. 3 | 0/0.6 | 0.64/0.58 |
| Com Ex. 1 | 0/0.3 | 1.28/1.16 |
| Com Ex. 2 | 0/0.6 | 1.12/1.09 |

As shown in Table 4, no matter the initial $CO_2$ loading is equal to 0 or is not equal to 0, the saturated DO value of Ex 3 is less than that of Com Ex. 1 and 2. Moreover, in each of Ex. 3 and Com Exs. 1-2, the saturated DO value corresponding to the $CO_2$ loading which is not equal to 0 is less than the saturated DO value corresponding to the $CO_2$ loading which is equal to 0.

Table 3 and Table 4 show that the $CO_2$ absorbent composition according to the present application has a lower saturated DO value, which can effectively ease the oxidative degradation, so that the deterioration of the $CO_2$ absorbent composition and the equipment corrosion can be prevented. Accordingly, the lifetime of the $CO_2$ absorbent composition and the lifetime of the equipment can be prolonged.

$CO_2$ absorbing experiment in batch mode: the $CO_2$ absorbent composition of the example/comparative example intended to be measured is placed in a reaction container. $N_2$ is introduce into a reaction container to remove other gases in the $CO_2$ absorbent composition. When the $CO_2$ concentration of the $CO_2$ absorbent composition is reduced to 0, the reaction container is heated to 50° C., then a gas mixture of $N_2$ and $CO_2$ is introduced into the reaction container to conducting the absorbing experiment, wherein the $CO_2$ concentration of the gas mixture is 10 vol %, and the volume flow rate of the gas mixture is controlled at the value of 550 mL/min. Samples of the $CO_2$ absorbent composition are regularly taken from the $CO_2$ absorbent composition, and the amounts of $CO_2$ and amine-containing compounds of the samples are determined by an autotitrator (888 Titrando, Metrohm AG, Switzerland), so as to obtain the $CO_2$ loading. In this situation, the $CO_2$ loading is also called $CO_2$ rich loading, because the $CO_2$ loading is obtained after the $CO_2$ absorbent composition absorbing the $CO_2$.

$CO_2$ regenerating experiment in batch mode: the $CO_2$ absorbent composition of the example/comparative example intended to be measured is introduced with $CO_2$ and fully stirred, meanwhile, the $CO_2$ loading is monitored by the autotitrator. The $CO_2$ is introduced into the $CO_2$ absorbent composition until the $CO_2$ loading of the $CO_2$ absorbent composition reaches to 80% of the saturated $CO_2$ loading. Then the $CO_2$ absorbent composition is placed in a reboiler, the reboiler is heated and pressurized to a desired temperature and pressure, and maintain the desired temperature and pressure for 90 minutes. Afterwards, the sample of the $CO_2$ absorbent composition is taken from the $CO_2$ absorbent composition, and the amounts of $CO_2$ and amine-containing compounds of the sample are determined by the autotitrator, so as to obtain the $CO_2$ loading. In this situation, the $CO_2$ loading is also called $CO_2$ lean loading, because the $CO_2$ loading is obtained after the $CO_2$ absorbent composition releasing the $CO_2$.

Figure 6:
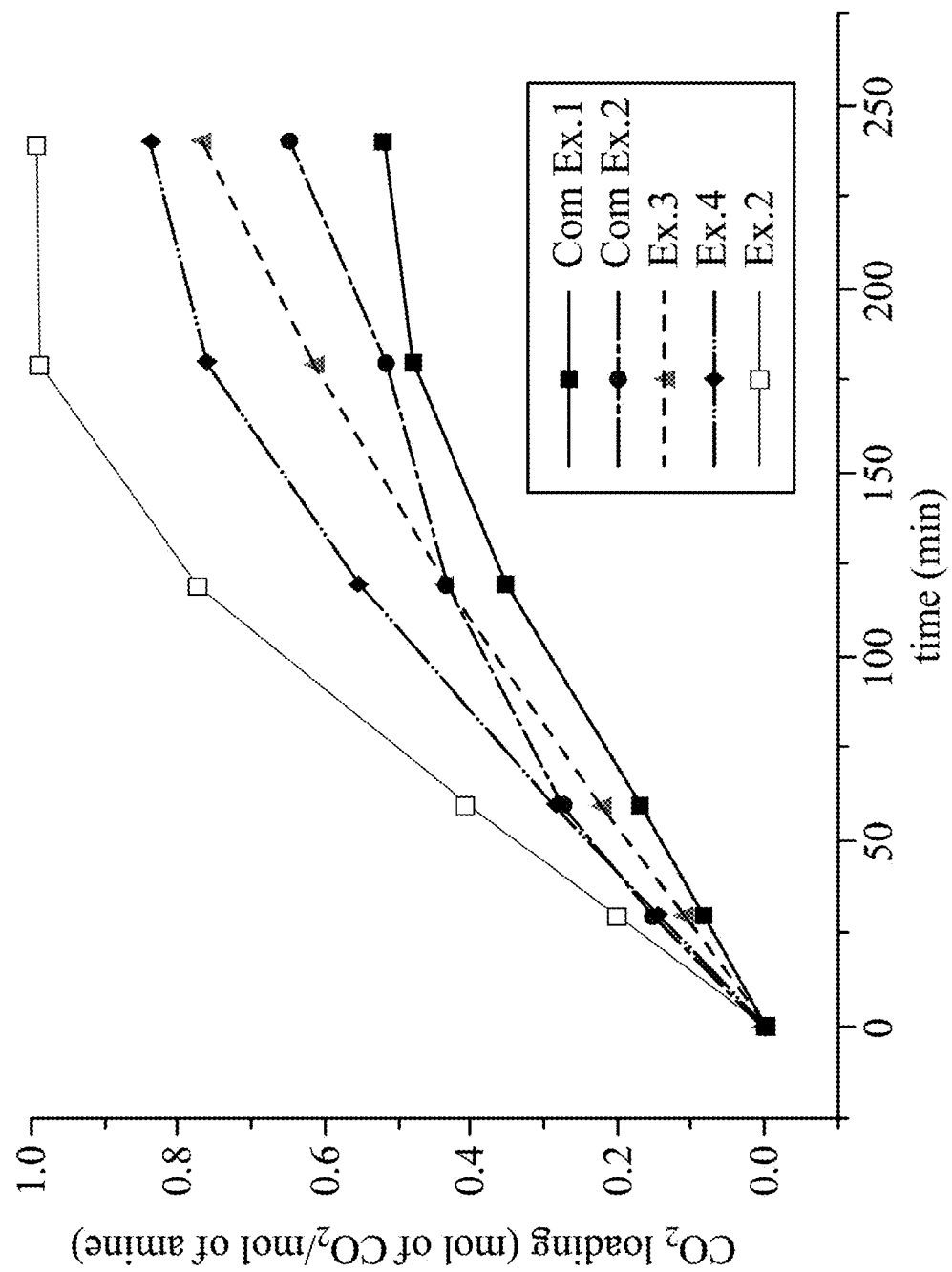
FIG. 6 shows absorbing curves of $CO_2$ of Exs. 2-4 and Com Exs. 1-2.

FIG. 6 shows absorbing curves of $CO_2$ of Exs. 2-4 and Com Exs. 1-2, i.e., the results of the $CO_2$ absorbing experiment in batch mode. In FIG. 6, the vertical axis represents the $CO_2$ loading, and the horizontal axis represents the time, wherein the $CO_2$ loading is the ratio of the mole number of $CO_2$ of the $CO_2$ absorbent composition to the mole number of amine-containing compounds of the $CO_2$ absorbent composition. As shown in FIG. 6, the absorption ratios of Exs. 2-4 are greater than or closed to that of Com Ex. 2, and the absorption ratio of Ex 3 is greater than or closed to that of Com Ex. 2 after 100 minutes. It shows that the $CO_2$ absorbent composition according to the present disclosure can absorb (i.e., capture) $CO_2$ effectively.

Table 5 shows the results of the $CO_2$ absorbing experiment in batch mode and the results of the $CO_2$ regenerating experiment in batch mode of Exs. 2-4 and Com Exs. 1-2. In Table 5, the $CO_2$ rich loading (L1) is the ratio of the mole number of $CO_2$ to the mole number of amine-containing compounds obtained by the $CO_2$ absorbing experiment, the $CO_2$ lean loading (L2) is the ratio of the mole number of $CO_2$ to the mole number of amine-containing compounds obtained by the $CO_2$ regenerating experiment. The regeneration ratio is calculated by the following formula: regeneration ratio=[(L2−L1)/L1]×100%. In Table 5, the operating conditions of the $CO_2$ absorbing experiment in batch mode are as follows: the pressure is 1 atm, the temperature is 50° C., and sampling time is 240 minutes; the operating conditions of the $CO_2$ regenerating experiment in batch mode is as follows: the pressure is 1 atm, the temperature is 90° C., and sampling time is 90 minutes.

TABLE 5

| example/ comparative example | CO₂ rich loading | CO₂ lean loading | regeneration ratio (%) |
|---|---|---|---|
| Ex. 2 | 0.99 | 0.60 | 39.39 |
| Ex. 3 | 0.76 | 0.6 | 21.05 |
| Ex. 4 | 0.83 | 0.61 | 26.5 |
| Com Ex. 1 | 0.52 | 0.49 | 5.77 |
| Com Ex. 2 | 0.65 | 0.6 | 7.69 |

The unit of each of CO₂ rich loading and CO₂ lean loading is mol of CO₂/mol of amine As shown in Table 5, the regeneration ratios of Exs. 2-3 are far greater than that of Com Ex. 1 and 2. That is, according to the $CO_2$ absorbent composition of the present disclosure, it is favorable to regenerate the $CO_2$ captured thereby, which is favorable for the application the $CO_2$.

Table 6 shows the results of the $CO_2$ absorbing experiment in batch mode and the results of the $CO_2$ regenerating experiment in batch mode of Ex. 9 and Com Ex. 1. In Table 6, the operating conditions of the $CO_2$ absorbing experiment in batch mode are as follows: the pressure is 1 atm, the temperature is 50° C., and sampling time is 240 minutes. There are two sets of operating conditions of the $CO_2$ regenerating experiment in batch mode, which are as follows: the pressure is 1 atm, the temperature is 90° C., and sampling time is 90 minutes; the pressure is 2 atm, the temperature is 120° C., and sampling time is 90 minutes.

TABLE 6

| example/ comparative example | CO₂ rich loading | CO₂ lean loading (1 atm ` 90° C.) | CO₂ lean loading (2 atm ` 120° C.) | re-generation ratio (%) |
|---|---|---|---|---|
| Ex. 9 | 0.75 | 0.54 | 0.29 | 28.5/61.3 |
| Com Ex. 1 | 0.52 | 0.49 | 0.27 | 5.8/48.1 |

The unit of each of CO₂ rich loading and CO₂ lean loading is mol of CO₂/mol of amine As shown in Table 6, when the pressure is raised from 1 atm to 2 atm, and the temperature is raised from 90° C. to 120° C., the regeneration ratios of Ex. 9 and Com Ex. 1 are enhanced. Furthermore, the regeneration ratios of Ex. 9 are all greater than that of Com Ex. 1 in the two sets of operating conditions.

Figure 7:
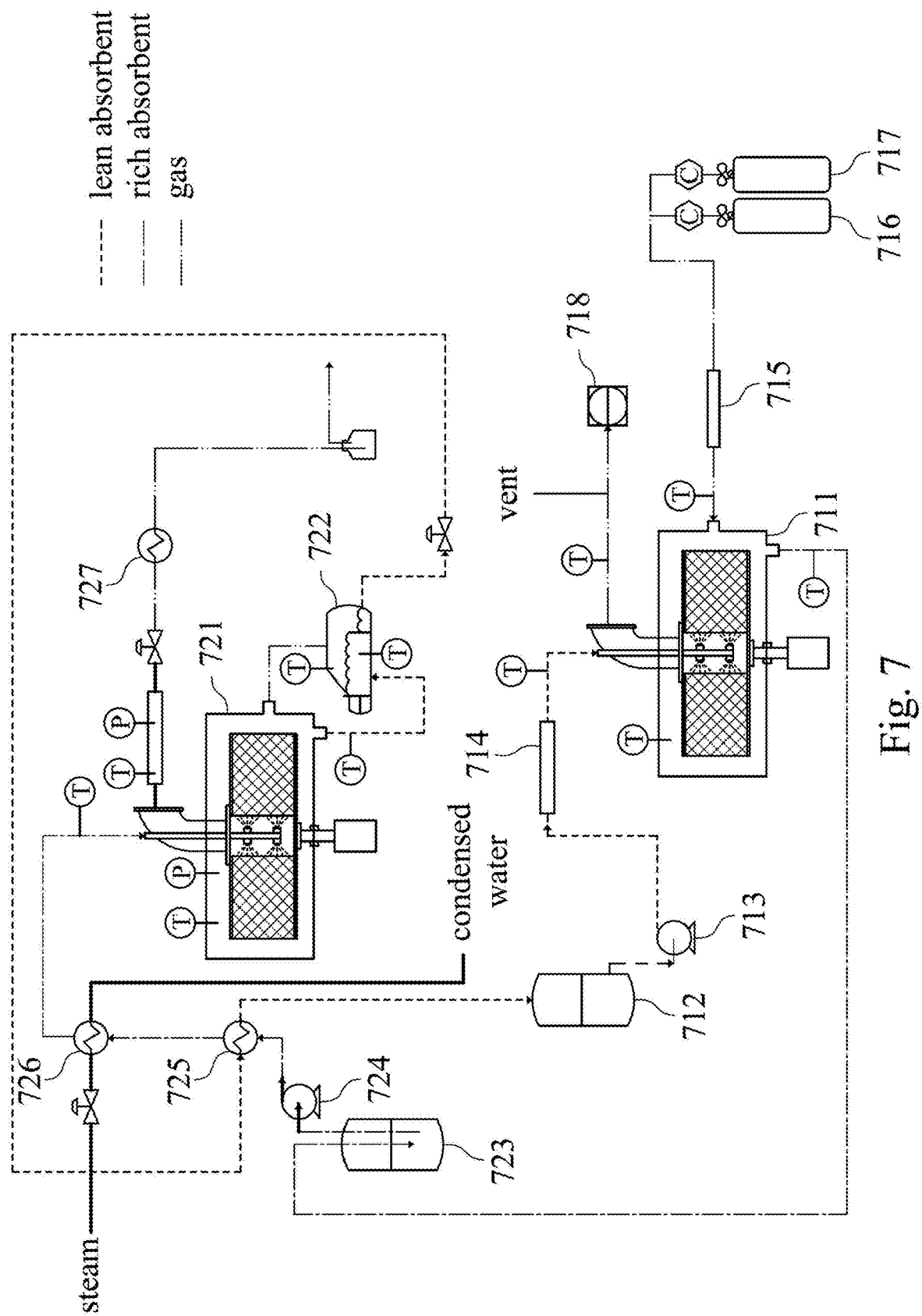
FIG. 7 is a schematic view of a device adopting two RPBs to capture and regenerate $CO_2$ in continuous mode.

The experiment of capturing and regenerating $CO_2$ in continuous mode by adopting RPBs: FIG. 7 is a schematic view of a device 700 adopting two RPBs (711, 721) to capture and regenerate $CO_2$ in continuous mode. The device 700 includes the RPB 711, a storage tank of lean absorbent 712, a metering pump 713, a liquid heater 714, a gas heater 715, a $N_2$ source 716, a $CO_2$ source 717, and a $CO_2$ analyzer 718, all of which are applied for capturing $CO_2$ and details thereof can refer to the related description of FIG. 3 and are not repeated herein. The device 700 further includes another RPB 721, a reboiler 722, a storage tank of rich absorbent 723, a metering pump 724, a heat exchanger 725, a heater 726, a cooler 727, all of which are applied for regenerating $CO_2$. The metering pump 724 is applied for pumping the $CO_2$ absorbent composition in the storage tank of rich absorbent 723 into the RPB 721. The RPB 721 and the reboiler 722 are applied to heat the $CO_2$ absorbent composition, so that the $CO_2$ in the $CO_2$ absorbent composition can be separated from the $CO_2$ absorbent composition by heat and can be regenerated. The heat exchanger 725, the heater 726, and the cooler 727 are applied to control the temperature of the liquid or the gas. In FIG. 7, T represents a thermometer, C represents a gas flow meter, and P represents a pressure meter. The storage tank of lean absorbent 712 is applied for storing the $CO_2$ absorbent composition with $CO_2$ lean loading, that is, the fresh $CO_2$ absorbent composition which is just prepared or the $CO_2$ absorbent composition delivered from the reboiler in which the $CO_2$ is just regenerated. Hereinafter, the $CO_2$ absorbent composition with $CO_2$ lean loading is also called lean absorbent. The storage tank of rich absorbent 723 is applied for storing the $CO_2$ absorbent composition with $CO_2$ rich loading, that is, the $CO_2$ absorbent composition which has absorbed $CO_2$. Hereinafter, the $CO_2$ absorbent composition with $CO_2$ rich loading is also called rich absorbent. As shown in FIG. 7, the lean absorbent in the storage tank of lean absorbent 712 is pumped into the RPB 711 via the metering pump 713. The $N_2$ source 716 and the $CO_2$ source 717 are applied to provide a gas mixture of $N_2$ and $CO_2$ as the feed gas. The feed gas and the lean absorbent are contacted with each other in the RPB 711, and the lean absorbent becomes the rich absorbent and flows to the storage tank of rich absorbent 723. The rich absorbent in the storage tank of rich absorbent 723 is pumped by metering pump 724 into the RPB 721 and then into the reboiler 722. The $CO_2$ of the rich absorbent is released therefrom and the rich absorbent becomes the lean absorbent in the reboiler 722. The $CO_2$ flows from the gas outlet of the RPB 721, through the cooler 727 and escapes into the air, and the lean absorbent flows back to the storage tank of lean absorbent 712. The aforementioned process is repeated, so that the $CO_2$ can be captured and regenerated in a continuous mode. It should be noted that the purpose of the experiment of capturing and regenerating $CO_2$ in continuous mode is for discussing the ability for capturing and regenerating $CO_2$ of the $CO_2$ absorbent composition, so that the regenerated $CO_2$ are vented into the air. However, in practical, the regenerated $CO_2$ can be collected for fixation or other application.

Table 7 shows the results of the $CO_2$ capturing experiment obtained by the device 700 of FIG. 7, and Table 8 shows the results of the $CO_2$ regenerating experiment obtained by the device 700 of FIG. 7. In Table 7, the operating conditions are as follows: the volume flow rate of the feed liquid is 200 mL/min, the volume flow rate of the feed gas is 40 L/min, the rotational speed of the RPB is 2800 rpm, the temperature is 50° C., and the $CO_2$ concentration of the feed gas is 10 vol %. In Table 8, the operating conditions are as follows: the volume flow rate of the feed liquid is 200 mL/min, the temperature of the feed liquid is 105° C., the rotational speed of the RPB is 900 rpm, the temperature of the reboiler is 120° C., and the pressure of the RPB is 2 atm. In Table 7 and Table 8, the $CO_2$ lean loading refers to the $CO_2$ loading of the example/comparative example after regenerating $CO_2$; the $CO_2$ rich loading refers to the $CO_2$ loading of the example/comparative example after absorbing $CO_2$. In Table 7 and Table 8, the unit of each of $CO_2$ lean loading and $CO_2$ rich loading is mol of $CO_2$/mol of amine.

TABLE 7

| example/ comparative example | CO₂ lean loading | CO₂ rich loading | CO₂ concentration of the outlet gas (vol %) | capture efficiency (%) |
|---|---|---|---|---|
| Ex. 3 | 0.65 | 0.89 | 3.20 | 70.2 |
| Com Ex. 1 | 0.33 | 0.51 | 4.54 | 57.1 |
| Com Ex. 2 | 0.64 | 0.92 | 3.14 | 70.8 |

TABLE 8

| example/comparative example | CO₂ rich loading | CO₂ lean loading | regeneration ratio (%) | regeneration energy (GJ/tonne of CO₂) |
|---|---|---|---|---|
| Ex. 3 | 0.89 | 0.65 | 26.9 | 3.94 |
| Com Ex. 1 | 0.51 | 0.33 | 34.8 | 4.32 |
| Com Ex. 2 | 0.92 | 0.64 | 30.8 | 4.11 |

As shown in Table 7, the capturing efficiency of Ex. 3 is greater than that of Com Ex. 1, and is comparable to that of Com Ex. 2. As shown in Table 8, the regeneration energy of Ex. 3 is lower than that of Com Exs. 1-2.

Figure 8:
FIG. 8 shows corrosion results for carbon steel of MEA, DETA and NaADS.

FIG. 8 shows corrosion results for carbon steel of MEA, DETA and NaADS, wherein (A) shows the appearances and weights of a carbon steel immersed in 30 wt % MEA which change over time, (B) shows the appearances and weights of another carbon steel immersed in 30 wt % DETA which change over time, and (C) shows the appearances and weights of yet another carbon steel immersed in 50 wt % NaADS which change over time. As shown in FIG. 8, when the immerse time is four weeks, a weight of the carbon steel immersed in 30 wt % MEA reduces 0.0303 g, a weight of the carbon steel immersed in 30 wt % DETA reduces 0.1131 g, and a weight of the carbon steel immersed in 50 wt % NaADS reduces 0.0254 g. According to the corrosion results, the corrosivity of 30 wt % MEA is 1.19 times of that of 50 wt % NaADS, and the corrosivity of 30 wt % DETA is 4.45 times of that of 50 wt % NaADS. It is apparent that even the concentration of NaADS is greater than that of MEA and DETA, the corrosivity for carbon steel of NaADS is still lower than the conventional CO₂ absorbents, MEA and DETA. Moreover, the corrosion results for carbon steel of Ex. 2 and Ex. 3 are measured, and the measuring method are the same as that of FIG. 8. That is, two carbon steels are immersed in Ex. 2 and Ex. 3, respectively. After four weeks, weights of the two carbon steels are measured, which show that the corrosivity of Ex. 3 is 30% less than that of Ex. 2. Moreover, the DETA of Com Ex. 2 is replaced by NaADS, when the corrosivity thereof is measured under saturated CO₂ loading, the corrosivity thereof is 49.5% less than that of original Com Ex. 2 (i.e., the DETA of Com Ex. 2 is not replaced by NaADS); when the corrosivity thereof is measured under 50% of saturated CO₂ loading, the corrosivity thereof is 81.8% less than that of original Com Ex. 2 (i.e., the DETA of Com Ex. 2 is not replaced by NaADS). Therefore, with the using of NaADS, or the using of NaADS and PZ, or the using of NaADS, PZ and DETA, the CO₂ absorbent composition according to the present disclosure is less corrosive than the conventional CO₂ absorbent which only includes MEA or only includes DETA. Accordingly, the equipment corrosion can be prevented, and the lifetime of the equipment can be prolonged.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A carbon dioxide absorbent composition, based on 100 parts by weight of the carbon dioxide absorbent composition, the carbon dioxide absorbent composition comprising:
    5 to 45 parts by weight of sodium 2-[(2-aminoethyl)amino]ethanesulfonate; and
    2.5 to 25 parts by weight of piperazine.

2. The carbon dioxide absorbent composition of claim 1, wherein a total weight of the sodium 2-[(2-aminoethyl)amino]ethanesulfonate and the piperazine is 30 to 60 parts by weight.

3. The carbon dioxide absorbent composition of claim 1, further comprising:
    diethylenetriamine, wherein a weight of the diethylenetriamine is greater than 0 parts by weight and is less than or equal to 15 parts by weight.

4. The carbon dioxide absorbent composition of claim 3, wherein a total weight of the sodium 2-[(2-aminoethyl)amino]ethanesulfonate, the piperazine and the diethylenetriamine is 30 to 60 parts by weight.

* * * * *